US012591067B2

(12) United States Patent
Lin et al.

(10) Patent No.: US 12,591,067 B2
(45) Date of Patent: Mar. 31, 2026

(54) METHOD AND APPARATUS FOR COOPERATIVE MULTI-TARGET ASSIGNMENT

(71) Applicant: Raytheon Company, Arlington, VA (US)

(72) Inventors: Yiqing Lin, Montgomery, NJ (US);
Amit Surana, Newington, CT (US);
Tuhin Sahai, San Francisco, CA (US);
Laura A. Gordon, Aurora, CO (US);
David C. Fisher, Evergreen, CO (US)

(73) Assignee: Raytheon Company, Arlington, VA (US)

( * ) Notice: Subject to any disclaimer, the term of this patent is extended or adjusted under 35 U.S.C. 154(b) by 425 days.

(21) Appl. No.: 18/155,390

(22) Filed: Jan. 17, 2023

(65) Prior Publication Data

US 2024/0241264 A1 Jul. 18, 2024

(51) Int. Cl.
*G01S 19/02* (2010.01)
*G01S 13/66* (2006.01)
*G06F 17/11* (2006.01)

(52) U.S. Cl.
CPC ..................................... *G01S 19/02* (2013.01)

(58) Field of Classification Search
CPC ......... G01S 19/00–48; G01S 13/00–95; G01S 5/00–18; G01S 3/00–86;
(Continued)

(56) References Cited

U.S. PATENT DOCUMENTS 10,476,584 B1 * 11/2019 Minelli ................... G06F 17/11
2005/0004759 A1 * 1/2005 Siegel ..................... G01S 13/66
701/519
(Continued)

OTHER PUBLICATIONS

Z. Chi and Z. Chun, "Research on Networked Cooperative fire control based on improved Hungary algorithm," 2021 International Conference on Control Science and Electric Power Systems (CSEPS), Shanghai, China, 2021, pp. 137-141, doi: 10.1109/CSEPS53726. 2021.00034. (Year: 2021).*
(Continued)

*Primary Examiner* — Vladimir Magloire
*Assistant Examiner* — Remash R Guyah
(74) *Attorney, Agent, or Firm* — Schwegman Lundberg & Woessener, P.A.

(57) ABSTRACT

A method including: receiving, at a given satellite, a target list, the target list identifying a plurality of targets; identifying a plurality of satellites of which the given satellite is part; generating, at the given satellite, a plurality of satellite-target pairs, each satellite-target pair including a respective one of the plurality of targets and a respective one of the plurality of satellites; identifying a plurality of costs, each of the plurality of costs corresponding to a different one of the plurality of satellite-target pairs; identifying, by the given satellite, a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target.

17 Claims, 4 Drawing Sheets

(58) Field of Classification Search
CPC ..... G01S 1/00–72; B64G 1/1021; B64G 3/00; B64G 1/66; B64G 1/1085; G01C 21/00–38; G01C 23/00; G05B 19/02; G05B 13/00–04; G05D 1/00–12; G05D 3/00–12; G06Q 10/00–20; G06Q 50/00–34; G06F 9/44–54; G06F 15/16; G06F 17/10–18; G08G 5/50; G08G 1/00–22; H04B 7/00; F41G 3/00–26; F41G 7/00–30; G06N 5/00–04; G06N 20/00–20; H04W 4/02–12; H04W 84/00–20

USPC .............. 342/357.395, 357, 450–465, 195.2; 455/132, 143, 456, 13.1–13.4, 121–126; 244/158.1–158.8, 164–170, 171.1–171.9, 244/175–180; 701/3–14, 23–26, 701/117–120, 200; 340/945–988, 340/870.02–870.16, 539.1–539.32
See application file for complete search history.

(56) References Cited

U.S. PATENT DOCUMENTS

| | | | |
|---|---|---|---|
| 2019/0252774 A1* | 8/2019 | Rodriguez De Luis ..................... H04B 7/086 | |
| 2022/0340310 A1* | 10/2022 | Nishiyama ........... B64G 1/1085 | |
| 2024/0103156 A1* | 3/2024 | Bowers ............... G01S 13/9021 | |

OTHER PUBLICATIONS

Chien, Steve et al. "The Techsat-21 Autonomous Space Science Agent." Proceedings of the First International Joint Conference on Autonomous Agents and Multiagent Systems: Jul. 15-19, 2002, Plazzo Re Enzo, Bologna, Italy. New York, NY, USA: ACM, 2002. 570-577. Web. (Year: 2002).*
Chi, Zhang, and Zhang Chun. "Research on Networked Cooperative Fire Control Based on Improved Hungary Algorithm." 2021 International Conference on Control Science and Electric Power Systems (CSEPS). IEEE, 2021. 137-141. Web. (Year: 2021).*

* cited by examiner

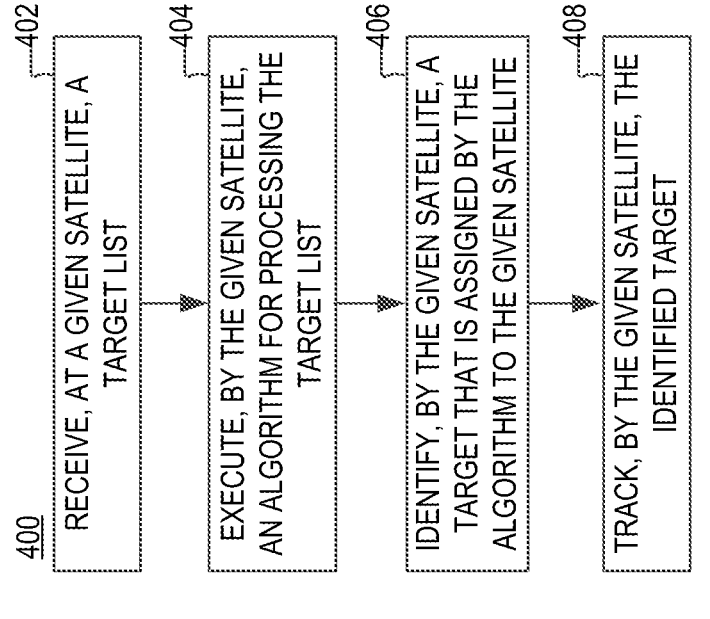

402 RECEIVE, AT A GIVEN SATELLITE, A TARGET LIST

404 EXECUTE, BY THE GIVEN SATELLITE, AN ALGORITHM FOR PROCESSING THE TARGET LIST

406 IDENTIFY, BY THE GIVEN SATELLITE, A TARGET THAT IS ASSIGNED BY THE ALGORITHM TO THE GIVEN SATELLITE

408 TRACK, BY THE GIVEN SATELLITE, THE IDENTIFIED TARGET

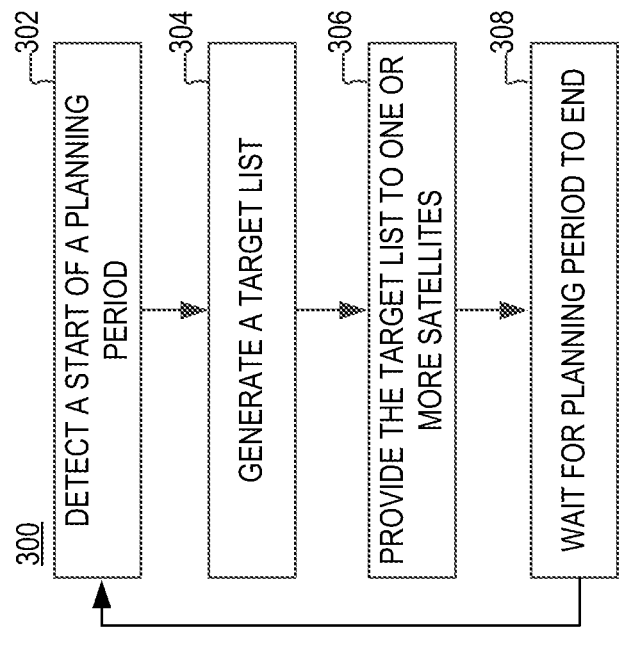

302 DETECT A START OF A PLANNING PERIOD

304 GENERATE A TARGET LIST

306 PROVIDE THE TARGET LIST TO ONE OR MORE SATELLITES

308 WAIT FOR PLANNING PERIOD TO END

METHOD AND APPARATUS FOR COOPERATIVE MULTI-TARGET ASSIGNMENT

BACKGROUND

As the space launch costs are decreasing and the capabilities of small satellites are increasing, new decentralized space architectures are emerging, for example, proliferated satellite constellations (e.g., proliferated low Earth orbit (pLEO)) that may include hundreds, or even thousands of satellites in (low) orbits.

These new architectures further enable commercial Earth observation and satellite communications, such as, global broadband Internet coverage broadcast from orbit and high-revisit overhead imagery of much of the Earth's surface. The application of proliferated constellations also includes the significant increase in the number of satellites on orbit will shape the future defense operating environment in space. The increase in the availability of satellite imagery and communications bandwidth on the open market also affects the operating environment in ground, maritime, and air domains, offering new capabilities that can address the problems facing the defense and commercial communication industries for applications, such as, tracking mobile targets, operating in the Arctic, or providing resilient space support in the face of growing counterspace threats.

Modern tracking systems typically include multiple target tracking (MTT) systems, in which one or more sensors generate multiple detections from multiple targets, and one or more tracks are used to estimate the states of these targets. The new multi-target tracking systems need to meet all or several demanding requirements of: (i) covering all the target tracks while obeying predefined satellite vehicle (SV) hand off overlap requirements, (ii) providing coverage using requisite minimum number of SVs, (iii) complying with SV target visibility constraints incorporating sun angles, and SV duty cycle constraints, (iv) incorporating task prioritization, (v) trading off tracking accuracy and SV utilization, and (vi) handling dynamic/uncertain missile launches (or new targets).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: receiving, at a given satellite, a target list, the target list identifying a plurality of targets; identifying a plurality of satellites of which the given satellite is part; generating, at the given satellite, a plurality of satellite-target pairs, each satellite-target pair including a respective one of the plurality of targets and a respective one of the plurality of satellites; identifying a plurality of costs, each of the plurality of costs corresponding to a different one of the plurality of satellite-target pairs; identifying, by the given satellite, a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target; and tracking, by the given satellite, at least one of the plurality of targets that is part of a same assignment pair as the given satellite.

According to aspects of the disclosure, a system, comprising: a memory; and at least one processor that is operatively coupled to the memory, the at least one processor being configured to perform the operations of: receiving a target list, the target list identifying a plurality of targets; identifying a plurality of satellites; generating a plurality of satellite-target pairs, each satellite-target pair including a respective one of the plurality of targets and a respective one of the plurality of satellites; identifying a plurality of costs, each of the plurality of costs corresponding to a different one of the plurality of satellite-target pairs; and identifying a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target.

According to aspects of the disclosure, a non-transitory computer-readable medium storing one or more processor-executable instructions, which, when executed by at least one processor of a storage system, cause the at least one processor to perform the operations of: receiving a target list, the target list identifying a plurality of targets; identifying a plurality of satellites; generating a plurality of satellite-target pairs, each satellite-target pair including a respective one of the plurality of targets and a respective one of the plurality of satellites; identifying a plurality of costs, each of the plurality of costs corresponding to a different one of the plurality of satellite-target pairs; and identifying a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a flowchart of an example of a process, according to aspects of the disclosure;

FIG. 4 is a flowchart of an example of a process, according to aspects of the disclosure;

DETAILED DESCRIPTION

Figure 1:
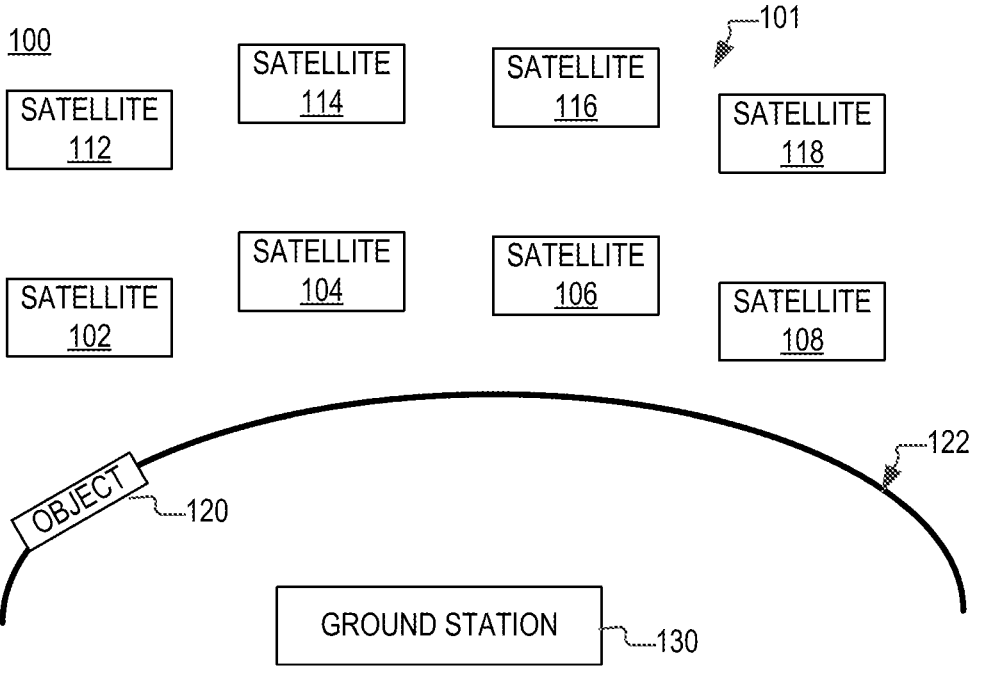
FIG. 1 is a diagram of an example of a system, according to aspects of the disclosure.

FIG. 1 is a diagram of an example of a system 100, according to aspects of the disclosure. As illustrated, the system 100 may include a constellation 101 and a ground station 130. The constellation 101 may include satellites 102-118, which can be used to track an object 120. Object 120 may travel along a trajectory 122. Each of the satellites 102-118 may be capable of observing only a portion of the trajectory 122. In this regard, as the object 120 travels along trajectory 122, the satellites 102-114 may take turns in tracking the object 120. Any of the satellites 102-118 may track the object 120 while the object 120 is within the field of view of the satellite; however, when the object 120 departs the field of view of the satellite, another satellite must take over the tracking of the object, so that a continuous track of the object can be provided to the ground station 130.

The discussion that follows provides examples of a technique that can be used by the satellites 102-118 to assume tracking responsibilities over objects that need to be tracked as the objects enter and leave the areas that are observable by different satellites. Specifically, processes 400-500 (shown in FIGS. 4-5) are provided, which can be executed by each or any of satellites 102-118. Executing process 500 on multiple satellites 102-118 may cause two or more of the satellites 102-118 to: (i) receive a list that identifies the same set of targets that are observable by the two or more satellites, and (ii) and assume tracking responsibilities over different ones of the observable targets. In other words, executing the process 500 may enable each of the satellites to pick different (and/or optimal) targets from the list to track. In some implementations, any of the processes 400-500 may be executed by a computing device that is carried onboard of the satellites 102-118. The computing device may have an architecture that is the same or similar to the architecture of computing device 600, which is shown in FIG. 6. In some implementations, each satellite may be configured to track only one target at any given time. Additionally or alternatively, in some implementations, each satellite may execute its own implementations of the assignment algorithm, but given that all satellites have the same input data, the output assignment should be the same for each of the satellites.

Figure 2:
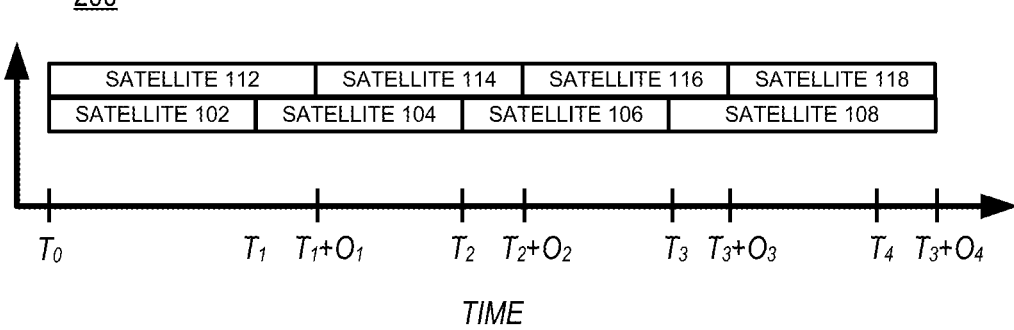
FIG. 2 is a graph showing aspects of the operation of the system of FIG. 1, according to aspects of the disclosure.

FIG. 2 is a chart showing the order in which satellites 102-118 take turns in tracking object 120, according to one example. In the example of FIG. 2, object 120 is airborne and traveling along trajectory 122 in the period starting at time $T_0$ and ending at time $T_4+O_4$. At any given time in the journey of object 120, object 120 may be tracked by one of satellites 102-108 and one of satellites 112-118.

As illustrated, satellite 102 may track object 120 in the period $T_0$-$T_1$. However, at time $T_1$, object 120 may exit the field of view of satellite 102, and satellite 104 may need to take over the tracking of object 120. Satellite 104 may track object 120 in the period $T_1$-$T_2$. However, at time $T_2$, object 120 may exit the field of view of satellite 104, and satellite 106 may need to take over the tracking of object 120. Satellite 106 may track object 120 in the period $T_2$-$T_3$. However, at time $T_3$, object 120 may exit the field of view of satellite 106, and satellite 108 may need to take over the tracking of object 120. Satellite 108 may track object 120 in the period $T_3$-$T_4$. The example of FIG. 2 assumes that there are no handoff requirements. With handoff requirements, there may be some overlap time when one satellite "hands off" the target tracking to another satellite. So if satellite 102 tracks the object 120 in the period from T0 to T1, then 104 may track the object from T1-$d$ to T2, where d is the required duration of handoff.

Satellite 112 may track object 120 in the period $(T_0)$-$(T_1+O_1)$. However, at time $(T_1+O_1)$, object 120 may exit the field of view of satellite 112, and satellite 114 may need to take over the tracking of object 120. Satellite 114 may track object 120 in the period $(T_1+O_1)$-$(T_2+O_2)$. However, at time $(T_2+O_2)$, object 120 may exit the field of view of satellite 114, and satellite 116 may need to take over the tracking of object 120. Satellite 116 may track object 120 in the period $(T_2+O_2)$-$(T_3+O_3)$. However, at time $(T_3+O_3)$, object 120 may exit the field of view of satellite 116, and satellite 118 may need to take over the tracking of object 120. Satellite 118 may track object 120 in the period $(T_3+O_3)$-$T_4$.

FIG. 3 is a flowchart of an example of a process 300, according to aspects of the disclosure. At step 302, the start of a planning period is detected. At step 304, a target list is generated that identifies one or more targets. At step 306, the target list is provided to one or more satellites. According to the present example, the target list is provided to each of satellites 102-118. At step 308, process 300 waits until the end of the planning period, after which process 300 returns to step 302. According to the present example, process 300 is performed by ground station 130. However, the present disclosure is not limited to any specific entity performing process 300. For example, in some implementations, the process 300 may be performed by one or more of satellites 102-118. Process 300 is provided to illustrate that each of the satellites 102-118 may receive an updated list at the beginning of each planning period. In other words, the term "planning period" may refer to the time period in which a target list is generated and/or used by any of satellites 102-118 as a basis for determining the tracking assignments of satellites 102-118.

FIG. 4 is a flowchart of an example of a process 400, according to aspects of the disclosure. At step 402, a target list is received at a given satellite. The given satellite may be any of satellites 102-118. The target list may be the same as the target list that is transmitted at step 306 of process 300. At step 404, the given satellite executes an algorithm for processing the target list. In one example, the algorithm may be implemented by a process 500, which is discussed further below with respect to FIG. 5. The algorithm may be executed for the purpose of determining which one of satellites 102-118 would monitor what target on the target list. At step 406, the given satellite identifies a target that is assigned to the given satellite by the algorithm (executed at step 404). At step 408, the given satellite tracks the identified target. Tracking the identified target may include periodically determining the location of the target and transmitting an indication of each determined location to ground station 130 or another recipient. In some implementations, the given satellite may track the target (identified at step 406) until the target exists the field of view of the target (i.e., until the target exits the portion of the earth's surface (or air above) that is observable by the given satellite).

Figure 5:
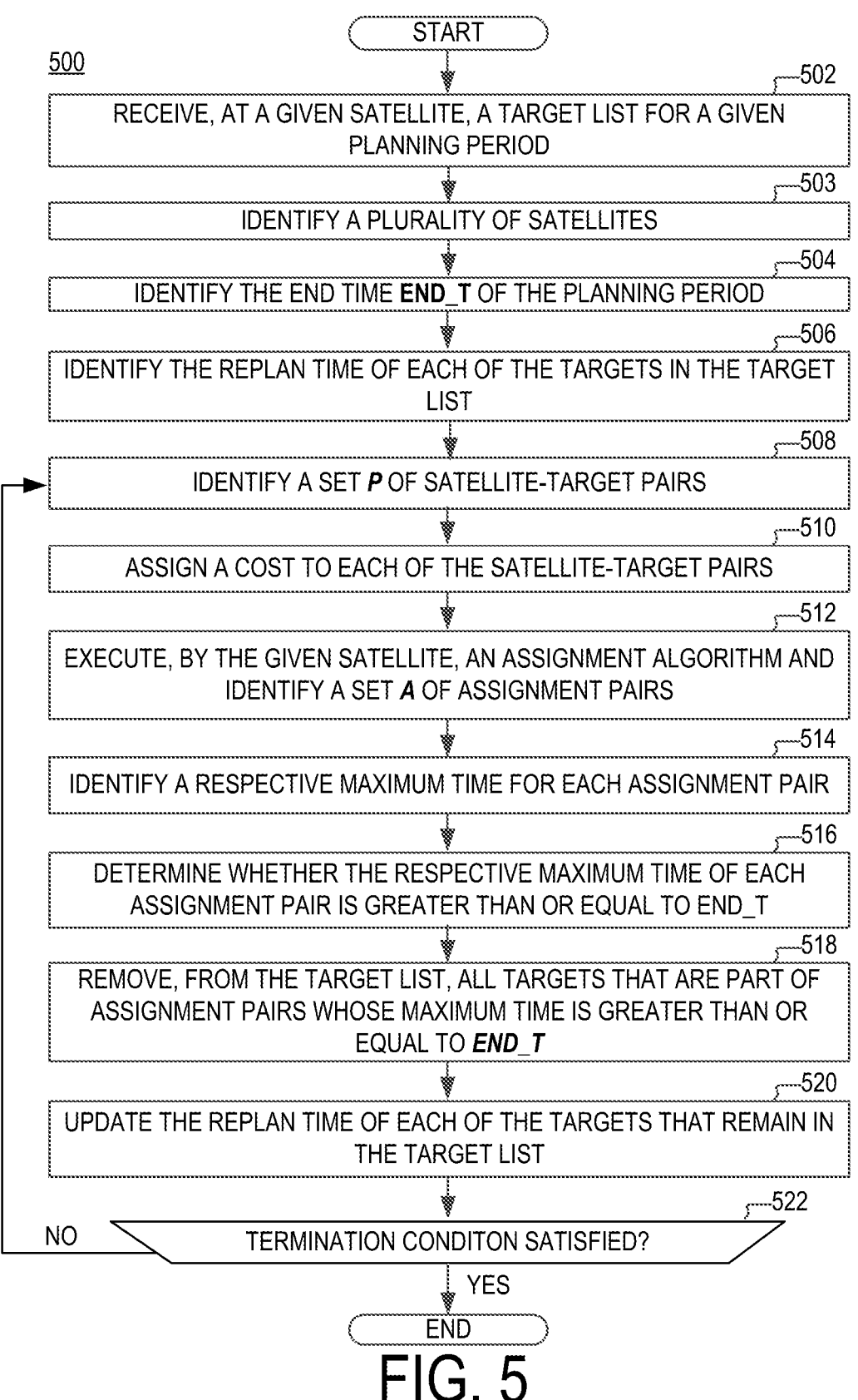
FIG. 5 is a flowchart of an example of a process, according to aspects of the disclosure.
Figure 6:
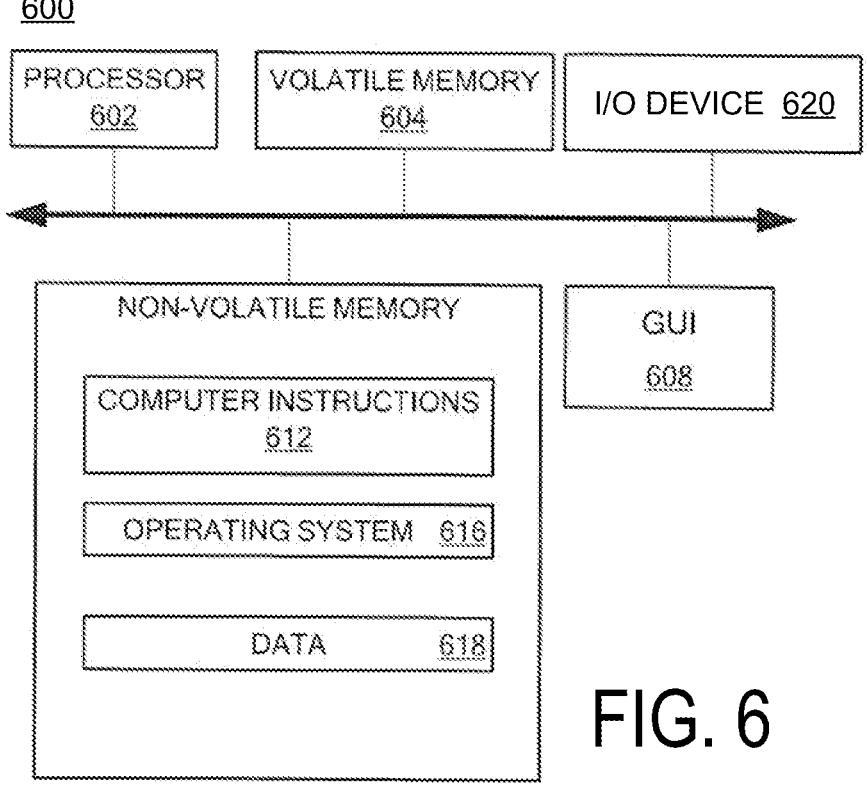
FIG. 6 is a diagram of an example of a computing device, according to aspects of the disclosure.

FIG. 5 is a flowchart of an example of a process 500 for assigning targets (in a list of targets) to different satellites in a constellation.

At step 502, a target list is received by process 500 and/or a given satellite that is executing process 500. The given satellite may be any of satellites 102-118. The given satellite may be the same as the satellite executing process 400 (shown in FIG. 4). The target list may be the same as the target list that is transmitted at step 306 of process 300. The target list may be received at the beginning of a planning period that corresponds to the target list. Process 500 may be executed during the planning period that corresponds to the target list. After the planning period expires, process 500 may be executed again using a new target list that corresponds to the next planning period.

As used herein, the term "target" refers to a representation of a physical object that is desired to be tracked by constellation 101 (shown in FIG. 1). If it is desired to track the object, at any given time, with one satellite only, the target list may contain only one target corresponding to the object. On the other hand, if it is desired to track the object with two satellites, the target lists may include two targets corresponding to the object. If it is desired to track the object with three satellites at any given time, the target list may include three targets that correspond to the object. In other words, for each track of the object, the target list may include a different target that corresponds to the object. The object may include an airborne object (e.g., a missile, airplane, etc.), a land-based object (e.g., a tank, etc.), spaced-based, and/or a sea-going object (e.g., a ship).

Each target that corresponds to the same object may be associated with a different satellite that is used to track the object. For example, if the object is tracked with a first satellite and a second satellite, the target list may include a first target that corresponds to the first satellite (or a first satellite identifier) and a second target that corresponds to the second satellite (or a second satellite identifier). As another example, if it is desirable to track an object with two satellites, but currently the object is being tracked with one satellite only, the first target may correspond to the first satellite (or a first satellite identifier) and the second target may correspond to a NULL satellite identifier.

Each target may have a corresponding replan time. The replan time of a target may be the time by which the object that is associated with the target would exit the field of view of the satellite that is associated with the target. In other words, the replan time of the target includes the time by which the object would exit the portion of the earth's surface (and the air/space above) that is observable by the satellite that is associated with the target.

According to the present example, the target list includes only targets whose replan time falls within the planning period of the target list. However, the present disclosure is not limited to the target list including any specific set of targets. In some implementations, at least two of the targets in the target list may correspond to different objects.

FIG. 5 is provided as an example only. Those of ordinary skill in the art will readily appreciate, after reading the present disclosure, that there are various ways to implement the algorithm that is embodied in the process 500. In this regard, it will be understood that the present disclosure is not limited to any specific "bookkeeping" method for distinguishing between objects and object tracks that are performed by individual satellites. The phrases "tracking a target" and "tracking an object represented by the target" are used interchangeably throughout the disclosure. Furthermore, it will be understood that at least some of the steps in the process 500 may be performed in parallel, in a different order, or altogether omitted. Although in the example of FIG. 5 the process 500 is executed by one of the satellites in constellation 101 (shown in FIG. 1), it will be understood that the present disclosure is not limited to any specific entity executing the process 500.

At step 503, the given satellite identifies a plurality of satellites of which the given satellite is part. In the present example, the constellation 101 (shown in FIG. 1) is identified. Identifying the plurality of satellites may include retrieving, from a memory, a list of the satellites and/or receiving the list from ground station 130 or a satellite.

At step 504, the given satellite determines the end time END_T of the planning period in which the target list (received at step 502) is generated.

At step 506, the given satellite determines the respective replan time of each of the targets that are identified in the target list.

At step 508, a set P of satellite-target pairs is identified. Each satellite-target pair in the set may include an identifier of one of the satellites in plurality (identified at step 503) and an identifier of one of the targets in the target list (received at step 502). In some implementations, the plurality of satellite-target pairs may include as many as possible (or fewer) combinations between a satellite from the plurality (identified at step 503) and a target from the target list (received at step 502). Additionally or alternatively, in some implementations, each of the satellite-target pairs may include a target that is observable by the satellite in the same pair.

At step 510, a different respective cost is assigned to each of the satellite-target pairs. The cost for a satellite-target pair may be a measure of how good of a match is a satellite for a target. Any two of the costs assigned at step 510 may have the same or different values. In some implementations, the cost for each satellite-target pair may be based on the distance between the satellite and the target in the pair. Additionally or alternatively, the cost for any of the satellite-target pairs may be based on one or more of target prioritization, target tracking accuracy (e.g., geometric dilution of precision, etc.), and/or resource utilization (e.g., power consumption, etc.). Additionally or alternatively, in some implementations, the cost for any of the satellite-target pairs may be a weighted sum of multiple factors including: (i) distance between the satellite that is part of the pair and the target that is part of the pair, (ii) the predicted duration in which the satellite that is part of the pair can track the target that is part of the pair, (iii) the angle between the target that is part of the pair and the satellite that is part of the pair, and/or (iv) the angle between the target (that is part of the pair) and another satellite that is currently assigned to the target. A cost may be a number, string, or alphanumerical string. It will be understood that the present disclosure is not limited to any specific method for assigning costs to the satellite-target pairs.

At step 512, the given satellite executes an assignment algorithm based on the set P of satellite-target pairs (identified at step 506) and the plurality of costs (determined at step 510). As a result of executing the algorithm, a set A of assignment pairs is identified. Each assignment pair may include an identifier of a target and an identifier of a satellite that is assigned to track the target. As can be readily appreciated, the set A may be a proper subset of the set P. Accordingly, each of the assignment pairs may be identical to a respective one of the satellite-target pairs in the set P, and as such, it may be associated with one of the costs (determined at step 510). In some implementations, the set A may identify one or more satellite assignments for each and every target in the target list. According to the present example, each assignment pair of which the given satellite is part constitutes an assignment of a target that is part of the assignment pair to the given satellite.

In some implementations, the identification of assignment pairs may be viewed as a combinatorial optimization problem, which is defined in terms of a number of agents (i.e., satellites) and a number of tasks (i.e., targets). Any of the agents (i.e., satellites) can be assigned any task (i.e., target) while incurring some cost corresponding to the agent-task pair (i.e., one of the costs identified at step 510). Each of the agents is required to perform as many tasks as possible by assigning one (or more than one) agent to each task. Finding a solution to the problem involves identifying a set of assignment pairs that has the smallest possible (and/or minimized) total cost. The total cost of a set of assignment pairs is the sum of the respective costs of the assignment pairs in the set.

In some implementations, step 512 may be executed by solving the above-described optimization problem. It will be understood that the present disclosure is not limited to any specific method and/or algorithm for solving the optimization problem as the problem is well understood by those of ordinary skill in the art of computer science. In some implementations, the Hungarian algorithm may be executed at step 512 to identify the assignment pairs. In instances in which the Hungarian algorithm is used, step 512 (as well as processes 400 and 500) may be executed by the given satellite independently of any of the remaining satellites in the plurality (identified at step 503). When each of the satellites in the plurality (identified at step 502) executes a different instance of the process 500 based on the same target list, each of the satellites in the plurality may arrive at the same set P of satellite-target pairs, the same set of costs for the satellite target pairs, and the same set A of assignment pairs. In one respect, using the Hungarian algorithm is advantageous because it enables each of the satellites in constellation 101 to determine its assigned targets independently of the other satellites in the constellation 101.

Alternatively, in some implications, the satellites in the plurality (identified at step 503) may cooperate with each other to solve the above-described optimization problem. Specifically, each of the satellites in constellation 101 would execute an instance of the process 500, and arrive at the same set P of satellite-target pairs, and the same set of costs for the satellite-target pairs. Afterwards, the satellites may exchange messages to negotiate which satellite would be tracking what object. As a result of the message exchange, a solution to the above-described optimization problem may be reached and a set of assignment pairs A may be identified that has a minimized (or otherwise reduced) total cost. In some implementations, a forward/backward auction algorithm and/or any other suitable type of similar algorithm may be used to implement to cooperative solution. In one respect, determining the set of assignment pairs A by cooperating with other satellites is advantageous because it would place a smaller computational load on the given satellite than if the Hungarian algorithm (or another similar algorithm) were to be used.

In some implementations, a plurality of algorithms can be available for selection by the process 500 or the given satellite that is executing the process 500. In some implementations, the plurality of algorithms may include at least one centralized algorithm and at least one distributed algorithm. Additionally or alternatively, in some implementations, the plurality of algorithms may include at least the Hungarian algorithm, a forward auction algorithm, and a backward auction algorithm. In some implementations, at step 512, the given satellite may select one of the plurality of algorithms and use the selected algorithm to solve the above-identified optimization problem. The selection may be performed based on one or more factors, such as the computing power that is available to the given satellite and/or the communications efficiency of the given satellite (e.g., the amount of power that is consumed by the transmission of communications to other satellites, the data rate of the communications, etc.). For example, if each of satellites 102-118 has high computational power, then a centralized algorithm like Hungarian can be selected, while if there is not sufficient power, then a distributed algorithm, such as forward auction, can be selected.

At step 514, the given satellite determines a different respective maximum time for each of the assignment pairs (identified at step 512). The maximum times for any two pairs may have the same or different values. According to the present example, the maximum time B(I, J) for an assignment pair (I, J) is the time for which a satellite I in the assignment pair can track a target J that is part of the same assignment pair. In other words, the maximum time B(I, J) for any assignment pair (I, J) is the time when target J would exit the field of view of satellite I (i.e. the time when the object represented by target J would exit the area that is observable by satellite I (or the time when the satellite would be off the duty cycle).

In some implementations, any of the assignment pairs (identified at step 512) may constitute a tracking assignment of the target in the assignment pair to the satellite in the same pair. In some implementations, the assignment may be valid for the period starting at the planning period of the target and ending at the maximum time for the pair.

At step 516, the given satellite determines whether the respective maximum time of each of the assignment pairs (identified at step 512) is greater than or equal to the end time of the planning period (identified at step 504).

At step 518, the given satellite removes from the target list all targets that are part of assignment pairs whose maximum time is greater than or equal to the end time of the planning period. In other words, if the maximum time (identified at step 514) for any of the assignment pairs (identified at step 512) is greater than or equal to the end time of the planning period (identified at step 502), the target that is part of the assignment pair would be removed from the target list.

At step 520, the given satellite updates the respective replan time of each of the targets that remain in the target list. In some implementations, the respective time replan time of any target may be updated in accordance with the following equation $$replan\_time = maximum\_time - overlap - 1$$

where replan_time is the updated replan time of the target, maximum_time is the maximum time of the assignment pair of which the target is part (calculated at step 514), and overlap is a constant that is provided to ensure that a new assignment of the target would be performed ahead of the target (or object represented by the target) exiting the field of view of the satellite that is currently assigned to track the target (or object represented by the target).

As illustrated, in one aspect, the process 500 may vary the replan time of each of the targets in the target list (in different iterations of steps 508-522). According to the present example, the replan time of a target is adjusted based on the maximum time of the satellite-target pair of which the target is part. However, additional implementations are possible in which the default replan time of each target is 30 seconds, and this value is increased or decreased as dictated by a variety of factors, such as whether a new target has been launched, whether any of the satellites 102-118 is experiencing a failure, or whether the object associated with the target deviates from its predicted trajectory. For example, if a new target launch is detected or if a trajectory deviation is detected, the replan time of the target may be reduced.

At step 522, the given satellite determines whether a predetermined condition is satisfied. If the condition is satisfied, the process 500 ends. Otherwise, the process 500 returns to step 508 and is repeated for whatever remains of the target list. In some implementations, the condition is satisfied if the target list becomes empty following the removal of targets from the target list (at step 518). Additionally or alternatively, in some implementations, the condition is satisfied if the end time (determined at step 504) has passed or is about to pass.

Referring to FIG. 6, in some embodiments, a computer 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

FIGS. 1-6 are provided as an example only. Throughout the disclosure, the term "satellite" shall be interpreted as being synonymous with "space vehicle". Thus a satellite may be a surveillance satellite, a space capsule, a space station, and/or any other suitable type of space vehicle. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments (1/17).

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:

receiving, at a given satellite, a target list, the target list identifying a plurality of targets;

identifying a plurality of satellites of which the given satellite is part;

generating, at the given satellite, a plurality of satellite-target pairs, each satellite-target pair including a respective one of the plurality of targets and a respective one of the plurality of satellites;

identifying a plurality of costs, each of the plurality of costs corresponding to a different one of the plurality of satellite-target pairs;

selecting, based on at least one of computing power of the given satellite and communications efficiency of the given satellite, an assignment algorithm from a plurality of available assignment algorithms resulting in a selected assignment algorithm;

identifying, by the given satellite and by executing the selected assignment algorithm, a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target; and tracking, by the given satellite, at least one of the plurality of targets that is part of a same assignment pair as the given satellite.

2. The method of claim 1, wherein the plurality of assignment pairs is identified by executing a Hungarian algorithm.

3. The method of claim 1, wherein at least one of the plurality of targets includes a representation of an object, the object being selected from the group consisting of an airborne object, a space-based object, a sea-going object, and a land-based object.

4. The method of claim 1, further comprising:

identifying a maximum time for each of the assignment pairs, the maximum time being a time by which an object corresponding to the target in the assignment pair would exit an area that is observable by the satellite in the assignment pair; and removing from the target list any targets that are part of assignment pairs whose maximum time is past an end time of a planning period that is associated with the target list.

5. The method of claim 1, wherein each of the assignment pairs corresponds to a period starting at a replan time of the target that is part of the assignment pair and ending at a maximum time for the assignment pair, the method further comprising updating the replan time of at least one of the plurality of targets based on the maximum time of one of the plurality of assignment pairs of which the target is part.

6. The method of claim 1, further comprising updating a replan time of at least one of the plurality of targets based on whether a launch of a new object is detected or based on whether an object associated with the target has deviated from a predicted trajectory.

7. A system, comprising:

a memory; and at least one processor that is operatively coupled to the memory, the at least one processor being configured to perform the operations of:

receiving a target list, the target list identifying a plurality of targets;

identifying a plurality of satellites;

selecting, based on at least one of computing power of the given satellite and communications efficiency of the given satellite, an assignment algorithm from a plurality of available assignment algorithms resulting in a selected assignment algorithm;

generating, by executing the selected assignment algorithm, a plurality of satellite-target pairs, each satellite-target pair including a respective one of the plurality of targets and a respective one of the plurality of satellites;

identifying a plurality of costs, each of the plurality of costs corresponding to a different one of the plurality of satellite-target pairs; and identifying a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target.

8. The system of claim 7, wherein the plurality of assignment pairs is identified by executing a Hungarian algorithm.

9. The system of claim 7, wherein at least one of the plurality of targets includes a representation of an object, the object being selected from the group consisting of an airborne object, a space-based object, a sea-going object, and a land-based object.

10. The system of claim 7, further comprising:

identifying a maximum time for each of the assignment pairs, the maximum time being a time by which an object corresponding to the target in the assignment pair would exit an area that is observable by the satellite in the assignment pair; and removing from the target list any targets that are part of assignment pairs whose maximum time is past an end time of a planning period that is associated with the target list.

11. The system of claim 7, wherein:

each of the assignment pairs corresponds to a period starting at a replan time of the target that is part of the assignment pair and ending at a maximum time for the assignment pair, the maximum time being a time by which an object corresponding to the target in the assignment pair would exit an area that is observable by the satellite in the assignment pair, and the at least one processor is further configured to perform the operation of updating a replan time of at least one of the plurality of targets based on a maximum time of an assignment pair of which the target is part.

12. The system of claim 7, wherein the system includes one of the plurality of satellites, and the at least one processor is further configured to perform the operation of tracking at least one of the plurality of targets that is part of a same assignment pair as the one of the plurality of satellites.

13. The system of claim 7, the at least one processor is further configured to perform the operation of updating a replan time of at least one of the plurality of targets based on whether a launch of a new object is detected or based on whether an object associated with the target has deviated from a predicted trajectory.

14. A non-transitory computer-readable medium storing one or more processor-executable instructions, which, when executed by at least one processor of a storage system, cause the at least one processor to perform operations of:

receiving a target list, the target list identifying a plurality of targets;

identifying a plurality of satellites;

selecting, based on at least one of computing power of the given satellite and communications efficiency of the given satellite, an assignment algorithm from a plurality of available assignment algorithms resulting in a selected assignment algorithm;

generating, by executing the selected assignment algorithm, a plurality of satellite-target pairs, each satellite-target pair including a respective one of the plurality of targets and a respective one of the plurality of satellites;

identifying a plurality of costs, each of the plurality of costs corresponding to a different one of the plurality of satellite-target pairs; and identifying a plurality of assignment pairs, the plurality of assignment pairs being identified based on the plurality of satellite-target pairs and the plurality of costs, each of the plurality of assignment pairs including a respective one of the plurality of targets and a respective one of the plurality of satellites that is assigned to track the respective target.

15. The non-transitory computer-readable medium of claim 14, wherein the plurality of assignment pairs is identified by executing a Hungarian algorithm.

16. The non-transitory computer-readable medium of claim 14, wherein at least one of the plurality of targets includes a representation of an object, the object being selected from the group consisting of an airborne object, a space-based object, a sea-going object, and a land-based object.

17. The non-transitory computer-readable medium of claim 14, wherein the one or more processor-executable instructions, when executed by the at least one processor, further cause the at least one processor to perform the operations of:

identifying a maximum time for each of the assignment pairs, the maximum time being a time by which an object corresponding to the target in the assignment pair would exit an area that is observable by the satellite in the assignment pair; and removing from the target list any targets that are part of assignment pairs whose maximum time is past an end time of a planning period that is associated with the target list.

* * * * *